United States Patent [19]

Uesugi

[11] 4,226,520

[45] Oct. 7, 1980

[54] SHOCK RESISTANT LENS DEVICE

[75] Inventor: Kyozo Uesugi, Sakai, Japan

[73] Assignee: Minolta Camera Kabushiki Kaisha, Osaka, Japan

[21] Appl. No.: 16,455

[22] Filed: Feb. 28, 1979

[30] Foreign Application Priority Data

Mar. 3, 1978 [JP] Japan .................................. 53-24774

[51] Int. Cl.³ .......................... G02B 15/14; G03B 3/00
[52] U.S. Cl. ..................................... 354/195; 350/187
[58] Field of Search ....................... 354/195, 286, 197; 350/255, 187, 44

[56] References Cited

U.S. PATENT DOCUMENTS

| | | | |
|---|---|---|---|
| 3,484,159 | 12/1969 | Roman et al. | 354/195 X |
| 3,594,068 | 7/1971 | Kirstein et al. | 350/187 X |
| 3,663,093 | 5/1972 | Iida | 350/187 |
| 3,944,340 | 3/1976 | Hashimoto | 350/187 X |
| 4,032,939 | 6/1977 | Elton | 354/197 |
| 4,110,008 | 8/1978 | Uesugi et al. | 350/255 |
| 4,172,634 | 10/1979 | Thompson | 350/187 |

*Primary Examiner*—J. V. Truhe
*Assistant Examiner*—Shelley Wade
*Attorney, Agent, or Firm*—Wolder, Gross & Yavner

[57] ABSTRACT

An impact resistant zoom lens with a common focusing and zooming ring includes a camera mountable main barrel, front and rear axially movable lens carrying mounts, a control ring rotatably and slidably engaging the barrel and affixed to the front mount, an axial sleeve helicoid coupled to the first mount, a cylindrical cam rotatably supported by the barrel and longitudinally stationary therein and followers carried by the axial sleeve rearwardly thereof and by the rear mount and slidably engaging respective cam slots in the cam and guide tracks in the barrel. In order to prevent damage to the lens mechanism attendant to an impact on the front mount abutment members or faces are located on the front mount or sleeve and have large areas in stop engagement when the front mount is in its rearmost position with the follower movable therewith being shortly spaced from the rear end of the respective cam slot. Similarly related faces or members may be provided for limiting the forward movement of the front mount.

28 Claims, 12 Drawing Figures

SHOCK RESISTANT LENS DEVICE

The present invention relates to an improved shock resistant structure in a zoom lens barrel having an optical system in which the lens element on the side closest to the object is axially moved both in the focusing and zooming operations, and being constructed so that both the focusing and zooming operations are performed by a manual operation of a single operating ring.

A type of zoom lens of the aforesaid nature is described in U.S. Pat. No. 3,663,093, issued on July 29, 1972, and, for example, includes a mechanism as shown in outline in FIG. 1 of the drawings herein, its optical system comprising a front first movable lens group L1 on the side closest to the object and a rear second movable lens group L2 on the camera side. Rotation or axial movement of a single operating ring 2 formed integrally with a lens mounting frame 1 holding first movable lens group L1 will move first movable lens group L1 along or move both first and second movable lens groups L1 and L2 along the optical axis, thereby providing focusing and zooming. Specifically, rotation of operating ring 2 rotates frame 1 integral with operating ring 2, holding frame 1 being guided by a helicoid 7 formed on the inner peripheral face of a sleeve portion of a holding frame 6 which is prevented from rotating by a pin 4 carried by frame 6 and slidably engaging an axial slot 5 in a fixed cylinder 3 and controllably movable only along the direction of the optical axis, to move along the optical axis together with first movable lens group L1 upon rotation of operating ring 2, whereby focusing is effected. When operating ring 2 is longitudinally moved along the optical axis, holding frames 1 and 6 are simultaneously moved with operating ring 2 in the direction of the optical axis, with pin 4 on frame 6 being guided by slot 5 in fixed cylinder 3. A cam ring 9 which rotatably engages an outer peripheral groove 8 formed in fixed cylinder 3 receives a follower pin 4 projecting through slot 5 of fixed cylinder 3 in a lead or cam groove 10 in cam ring 9. Thus, the cam ring 9 is rotated by way of the engagement of axially moving pin 4 with lead groove 10 when holding frame 6 is longitudinally moved in the direction of the optical axis in association with operating ring 2. Cam ring 9 is provided with a cam groove 11 for second movable lens group L2, and engaging cam groove 11 is a follower pin 14 which is carried by a mounting frame 12 holding second movabe lens group L2 and coaxially disposed inside fixed cylinder 3 and which extends through another axial slot 13 of fixed cylinder 3. When cam ring 9 is rotated as described above, pin 14 is pushed by cam groove 11 to move along slot 13 to cause the movement of holding frame 12 in the direction of the optical axis together with second movable lens group L2 in a similar manner to the movement of first movable lens group L1 together with operating ring 2 along the optical axis. Second movable lens group L2 is moved under the action of cam groove 11 at a speed or rate different from that of first movable lens group L1. When operating ring 2 is moved along the optical axis, zooming is thus thereby effected. It should be noted that an outer cylinder or sleeve 15 formed integrally with fixed cylinder 3 covers the outside of cam ring 9. An indicating cylinder or sleeve 16 with distance graduations and the like on its outer surface is located outside outer cylinder 15 and telescopes the operating ring 2. Formed in the inside face of the front end of indicating cylinder 16 is an annular groove 18, which is slidably engaged by a follower pin 17 carried on holding frame 6, thus permitting relative rotation between indicating cylinder 16 and holding frame 6 allowing the latter not to rotate while effecting their integral axial movement only. In addition, indicating cylinder 16 carries a follower pin 20 which engages an axial track or groove 19 in the inside face of operating ring 2, the maximum shift of holding frame 1, i.e., its focusing amount being controlled by pin 20 and groove 19. A mount 23 detachably mounts the lens barrel on a camera body (not shown) and is formed integrally with fixed cylinder 3. An operating holder 24 is held when mounting or detaching the lens barrel on or from the camera body.

As shown in FIG. 3 (a) and (b), the zoom lens has a stop 27 and a circumferentially elongated recess 26 engaged by stop 27 respectively provided on fixed cylinder 3 and cam ring 9 in order to restrict the rotation of cam ring 9 relative to fixed cylinder 3 to a predetermined amount upon zooming operation. The construction for restricting the amount of rotation of cam ring 9 serves to assure the smooth zooming operation at all times by pin 4 and lead groove 10 as well as by pin 14 and cam groove 11. However, the following problems may occur, although such mechanism for smooth zooming operation is provided.

That is, the front head 25 of the lens barrel, whether or not it is mounted on a camera body, often strikes or is struck by other objects whereby an impact force is imparted to the lens barrel head 25. The action of the impact force is generally toward the rear or straight on (in the direction shown by arrow A) or in a similar direction toward the camera. Such direction is the same as the direction along which holding frame 1 having lens barrel head 25 is moved upon zooming operation. In addition, even if the impact force acts in a completely different direction, holding frame 1 is sharply moved, in most cases, rearwardly toward the camera side (in the direction of arrow A) under the action of the impact force, since holding frame 1 is so constructed as to move axially linearly or in a simple straight direction. At this time, frame 6 helicoid connected to frame 1 is thereby sharply rearwardly moved (in the direction of arrow A). As a result, frame 6 sharply moves rearwardly when there is some room for frame 6 to reach the extreme telephoto position of zooming operation where frame 6 is most rearwardly retracted. When frame 6 reaches the extreme telephoto position of its zooming operation, an end 26a of elongated groove 26 abuts stop 27, as shown in FIG. 3(a) to prevent further rotation of cam ring 9. When cam ring 9 is stopped, pin 4 is prevented from moving whereby frames 1 and 6 are suddenly stopped from moving. Accordingly, the impact force on lens barrel head 25 acts between lead groove 10 and pin 4 which strike each other. The engaged relationship between lead groove 10 and pin 4 is very small in contact area, being approximately a line contact, resulting in a great impact load per unit area. This may cause the inner surface of lead groove 10 to be deformed into a dent or depression which, in turn, resists or interferes with subsequent zooming operation, or pin 4 to be damaged or broken, thus causing problems in precision and durability. Similar problems may occur in case frames 1 and 6 are originally positioned at its extreme telephoto position.

When frames 1 and 6 are moved for a zooming operation to the wide angle photography position, the direction of movement is, in general, opposite to that of the action of an impact force on lens barrel head 25. Therefore, even if an end 26b of elongated recess 26 abuts stop 27, as shown in FIG. 3(b), zooming operation toward the extreme wide angle photography position, i.e., movements of frames 1 and 6 toward the object side, is carried out manually alone, causing no impact force generally to act as described earlier. However, there exists the possibility of an impact force causing frames 1 and 6 to move in the direction of zooming operation toward extreme wide angle photograph position when, for example, operating ring 2 is otherwise accidentally restrained thereby resulting in the above-mentioned problems. In addition, similar problems, though insignificant, may occur when operating ring 2 is manually operated toward the object side without consciousness of the frames 1 and 6 being restricted in their movement to predetermined amounts, thus resulting in the disadvantage that inaccuracy and malfunction of the zooming mechanism tend to occur.

SUMMARY OF THE INVENTION

A principal object of the present invention is to provide an improved zoom lens barrel of the type which permits both zooming and focusing operations by a single operating ring.

Another object of the present invention is to provide a highly durable zoom lens barrel in which the internal motion transmitting mechanisms, such as cam grooves and follower pins, are prevented from being damaged or broken even if an impact force is imparted to the front end of the lens barrel.

Still another object of the present invention is to provide a zoom lens barrel which assures a smooth zooming operation at all times.

The above and other objects of the present invention will become apparent from a reading of the following description taken in conjunction with the accompanying drawings which illustrate preferred embodiments thereof.

In a sense, the present invention contemplates the provision of an improved zoom lens having a common focusing and zooming ring and of the general nature described above in which a follower movable with the front lens mount engages a cam slot in a cylindrical cam which controls the longitudinal movement of the rear lens mount, the improved zoom lens being characterized by the provision of a first stop face longitudinally movable with the front lens mount and a stationary second stop face carried by the camera mountable barrel section, the stop faces being in stop abutment when the front lens mount is in its rearmost position with the follower being forward of the rear end of the cam slot.

In an improved zoom lens, any impact imparted to the front end of the zoom lens by-passes the focusing and zooming mechanism and is transmitted directly to the camera mountable main barrel section.

DETAILED DESCRIPTION OF THE PREFERRED EMBODIMENTS

Figure 1:
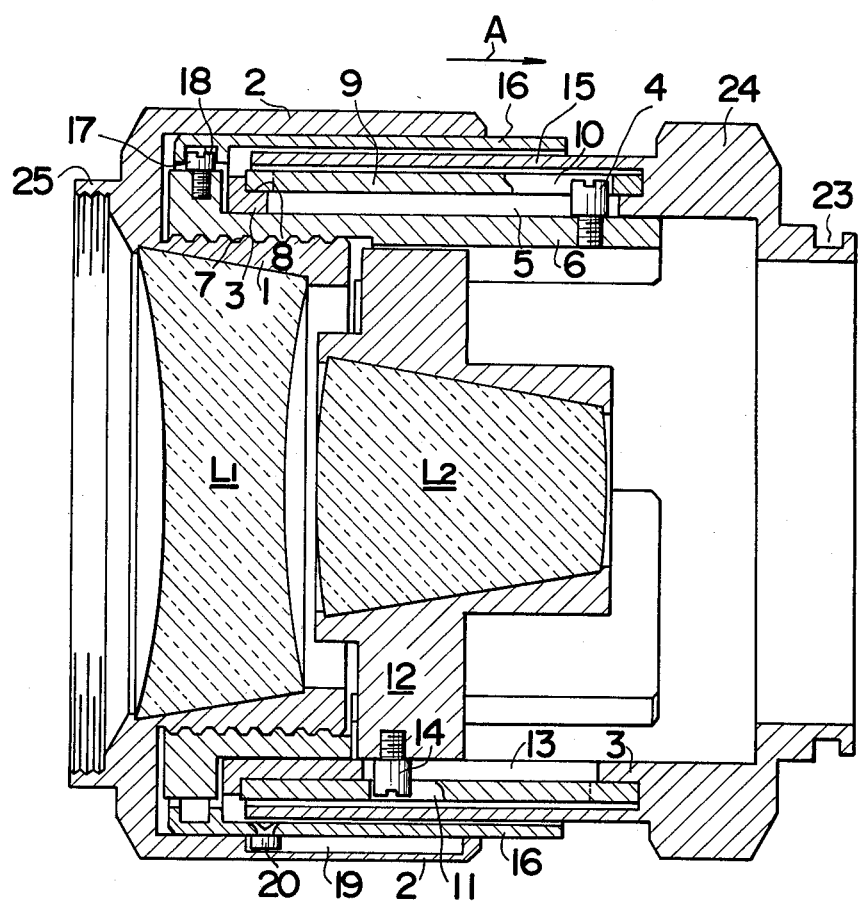
FIG. 1 is a medial longitudinal cross-sectional view of a prior art zoom lens barrel.
Figure 2:
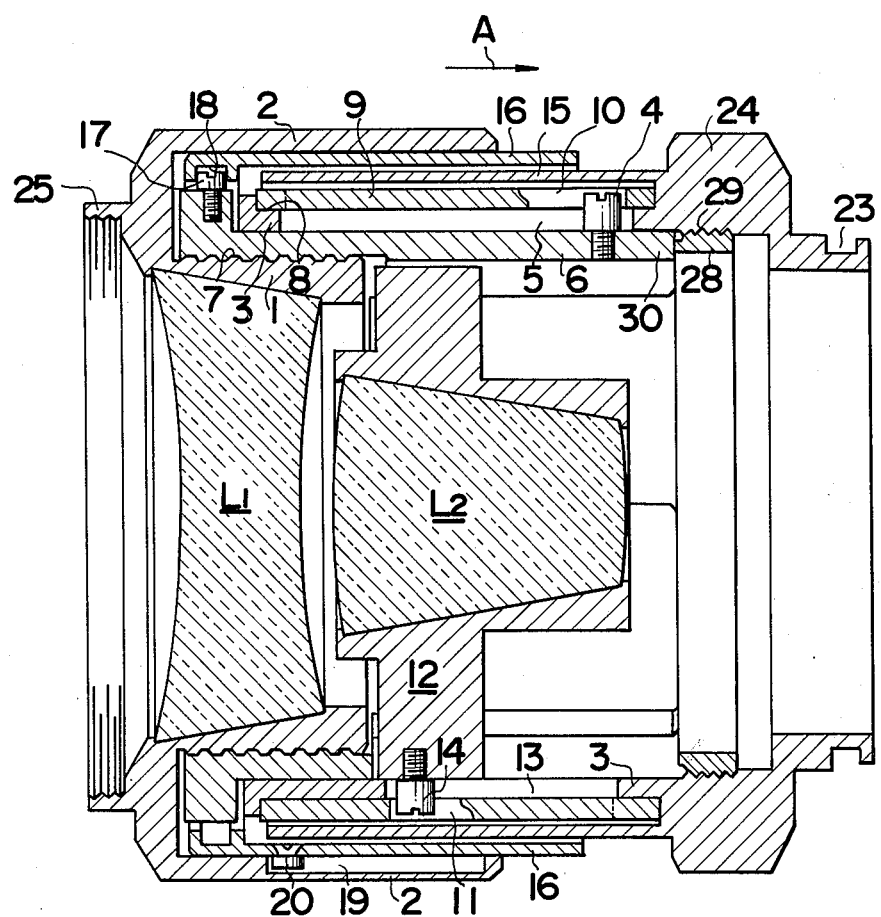
FIG. 2 is a medial longitudinal cross-sectional view of a zoom lens barrel of one embodiment according to the present invention.
Figure 3:
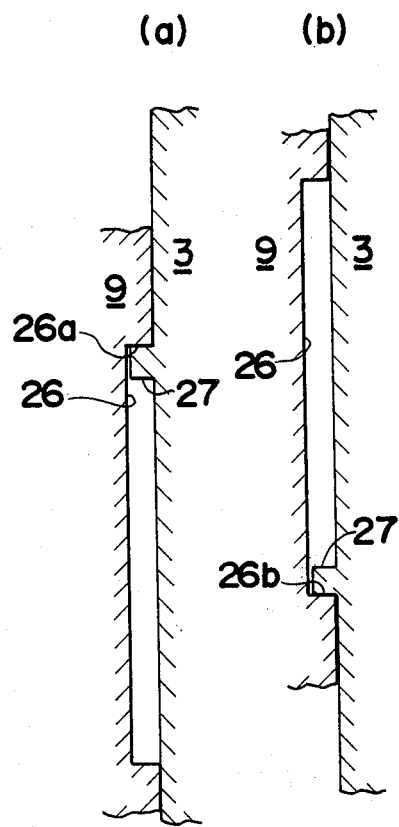
FIGS. 3 (a) (b) are evolved views respectively showing an essential part of cam ring 9 and fixed cylinder 3 of the prior art zoom lens barrel in FIG. 1.
Figure 4:
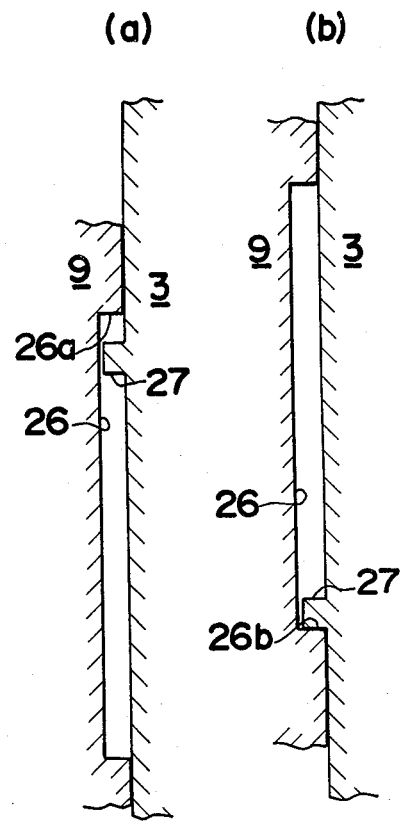
FIGS. 4 (a) (b) are evolved views respectively showing an essential part of cam ring 9 and fixed cylinder 3 of the zoom lens barrel of the embodiment shown in FIG. 2.

Referring now to FIGS. 2 and 4, which illustrate a first preferred embodiment of the present invention, it should be understood that the members corresponding in reference number and symbol to those in FIGS. 1 and 3 are identical in construction and function with the latter and that their further description is omitted for simplification.

A ring 28 is secured by means of a screw portion 29 to the inside peripheral face of the fixed cylinder 3. Ring 28 is positioned longitudinally rearwardly of or closer to the camera side than frame 6 and opposes the rear end 30 of frame 6 on the camera side. Ring 28 is secured in position to fixed cylinder 3 so that it abuts end 30 of frame 6 at the position where frame 6 is most retracted rearwardly or to the camera side (i.e., the position controlled by stop 27 and elongated recess 26) or immediately before frame 6 reaches the position when moved toward the camera side (in the direction of an arrow A). Ring 28 may be secured to fixed cylinder 3 by any suitable means in place of screw portion 29.

In the above embodiment, even if an impact force is imparted to lens barrel head 25 causing holding frames 1 and 6 to move in a direction rearwardly toward the camera side which corresponds to the direction of the movement of the frames 1 and 6 upon zooming operation to extreme telephoto position, the rearward movement is stopped when end 30 of frame 6 abuts stop ring 28. Holding frame 6 is stopped when it reaches the position controlled by stop 27 and elongated recess 26 where holding frame 6 is most retracted to the camera side or immediately before it reaches the said position. For example, therefore, when holding frame 6 is stopped immediately before its rearmost retractable position to the camera side, there is still a clearance between stop 27 and the end 26a of elongated recess 26, as shown in FIG. 4(a). In this condition, the cam ring 9 can be further rotated when a very high rotational force is applied thereto. Therefore, the impact force acting on lens barrel head 25 produces little effect between pin 4 and cam ring lead groove 10. As a result, the conventional problems are obviated. End 30 of holding frame 6 and ring 28 constitute together a stopper means and a stop means for absorbing the impact force. The stop means is a means for receiving the impact force while the stopper means is a means for transmitting the impact force on lens barrel head 25 to the stop means.

According to the first embodiment of the present invention, the impact force acts centrally on the contact portion between end 30 of holding frame 6 and ring 28. For the reasons, however, that holding frame 6 and ring 28 are held with sufficient strength by holding frame 1 and fixed cylinder 3, respectively, end 30 of holding frame 6 and ring 28 are sufficiently strong, and the contact area between both can be sufficient, the impact force can be completely absorbed by holding frame 6 and ring 28 without adversely affecting any other part. Furthermore, there is no possibility of holding frame 6 and ring 28 being damaged or broken.

It should be noted that if manufactured with high dimensional precision, ring 28 may be formed integrally with fixed cylinder 3 and it need not necessarily be of the shape of a ring. The movement of the frame 6 toward extreme wide angle photography is restricted, as shown in FIG. 4(b), by the abutment between stop 27 and the end 26b of elongated recess 26 in a similar manner to that of the prior art lens barrel. The force applied to holding frame 6 so that it is moved toward the object side (in the opposite direction of arrow A) can be absorbed similarly to the above by the construction that holding frame 1 or a sufficiently strong part of an optional member sufficiently strongly carried thereby abuts fixed cylinder 3 or a sufficiently strong part of an optional member held thereby with sufficient strength. When it is so constructed that reciprocal axial movements of holding frame 6 are restricted by the above-mentioned mechanisms, stop 27 and elongated recess 26 may be omitted.

Zooming operation is provided by the predetermined relative movements of lens groups L1 and L2, the movements of these lenses being highly complex in that the movement directions are inverted during zooming operation toward the extreme telephoto position and the extreme wide angle photography position. Accordingly, the principal feature of the present invention lies in stopping the movement of the holding frame for lens element on the closest side of the optical axis or the movement of a member intregrally movable therewith when holding frame 6 to which the impact force is transmitted reaches its most retracted position to the camera side and its advanced position closest to the object side or immediately before it reaches such positions, irrespective of the lens being zoomed to the extreme telephoto position or the extreme wide angle photography position.

Figure 5:
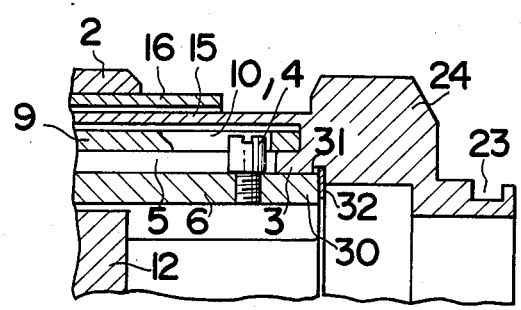
FIGS. 5 through 12 are fragmentary, medial longitudinal cross-sectional views of essential parts of the second through ninth embodiments of the present invention.

FIG. 5 shows a second embodiment of the present invention in which an annular groove 31 is formed in the inner peripheral face of fixed cylinder 3 and an adjusting washer 32 is positioned therein as a receiving means in substitution for ring 28 in FIG. 2. In the present embodiment, the impact force imparted to lens barrel head 25 is received by the abutment of end 30 on holding frame 6 upon washer 32. With this construction, fabrication and assembly are greatly facilitated when compared to structure employing ring 28.

Figure 6:
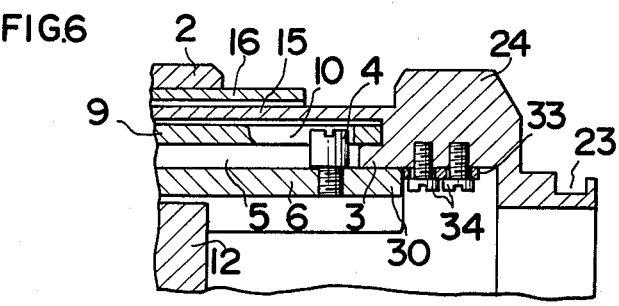

FIG. 6 shows a third embodiment of the present invention in which a stop plate 33 on which end 30 of holding frame 6 abuts is strongly secured to the inner circumference of fixed cylinder 3 with two or more screws 34, stop plate 33 being suitably curved to the inner circumference of fixed cylinder 3. The stop plate 33 may be of a cylindrical type.

Figure 7:
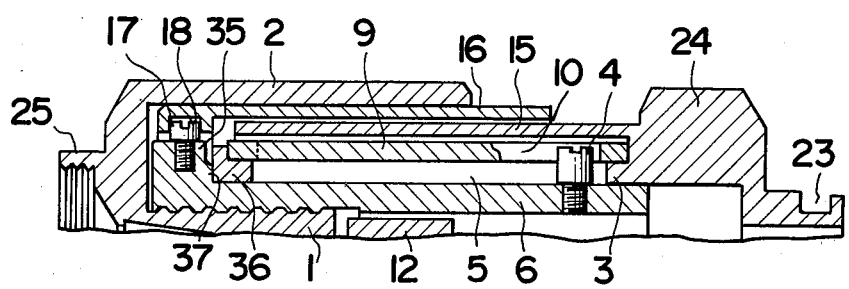

FIG. 7 illustrates a fourth embodiment of the present invention in which a projection 37 which abuts a front end 36 of fixed cylinder 3 before the holding frame 6 moves to its most retracted position is integrally formed at the rear of a front end shoulder 35 of holding frame 6 so that an impact force imparted to lens barrel head 25 is received by front end 36 and projection 37 when brought into abutment, the projection 37 being of ring shape or other suitable shape.

Figure 8:
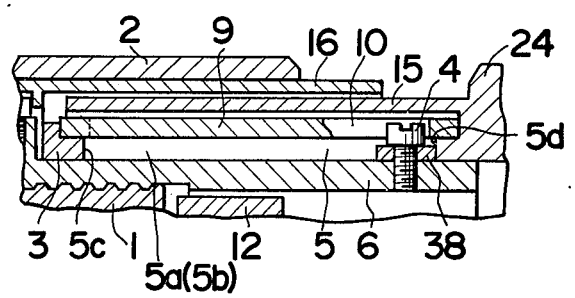

FIG. 8 shows a fifth embodiment of the present invention in which a collar or washer 38 is secured to holding frame 6 by means of the follower pin 4 carried thereby. Collar 38 slidably engages the axial slot 5 in fixed cylinder 3 and is in surface contact with both sides 5a and 5b of slot 5, and is of annular shape so that it may come into surface contact with alternative ends 5c and 5d of slot 5 as it moves along the optical axis. This ensures that the impact force is received by the surface contact between either end 5c or 5d and collar 38. Collar 38 and axial groove 5 together with pin 4 cooperate with each other to restrict the movement of the holding frame 6 at either end position of the zooming operation, on the extreme telephoto position or extreme wide angle photograph position, thereby permitting the omission of stop 27 and elongated recess 26, as shown in FIG. 4.

Figure 9:
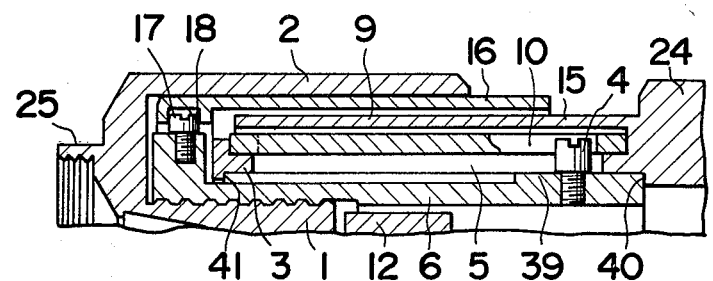

FIG. 9 illustrates a sixth embodiment of the present invention in which a projection 39 is formed on the rear end of the outside peripheral face of holding frame 6, and opposing flange or shoulder portions 40 and 41 disposed in the path of an engageable with projection 39 project inwardly from the inner peripheral face of fixed cylinder 3. In the operation of the present embodiment, an impact force imparted to lens barrel head 25 is absorbed by the engagement of projection 39 with either of flange portions 40 and 41 in the manner described earlier, eliminating the need for stop 27 and elongated recess 26, as shown in FIG. 4.

Figure 10:
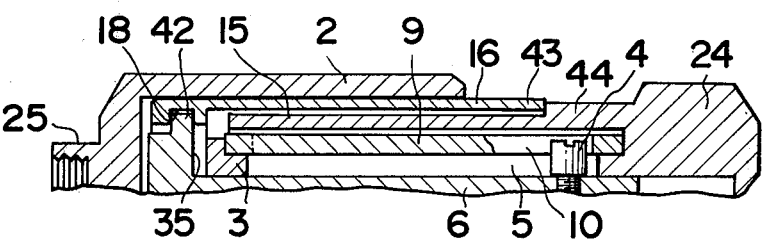

FIG. 10 shows a seventh embodiment of the present invention in which an impact resistant annular flange 42 is integrally formed on the outer face of front end shoulder 35 of holding frame 6 as a substitute for the pin 17 shown in FIG. 2, flange 42 rotatably engaging an annular groove 18 formed in indicating ring 16. Flange 42 connects holding frame 6 to indicating ring 16 firmly in relation to their axial or longitudinal movement in the direction of the optical axis. On the other hand, provided on the external cylinder 15 formed integrally with fixed cylinder 3 is a shoulder portion 44 which engages the rear free end 43 of indicating ring 16 when holding frame 6 is moved to its rearmost position or immediately before it reaches such position. In the instant embodiment, an impact force imparted to lens barrel head 25 is transmitted through flange 42 to indicating ring 16 and is absorbed at the position of shoulder portion 44 formed integrally with fixed cylinder 3. In the structure of the present embodiment, stop 27 and elongated recess 26, as shown in FIG. 4, are required.

Figure 11:
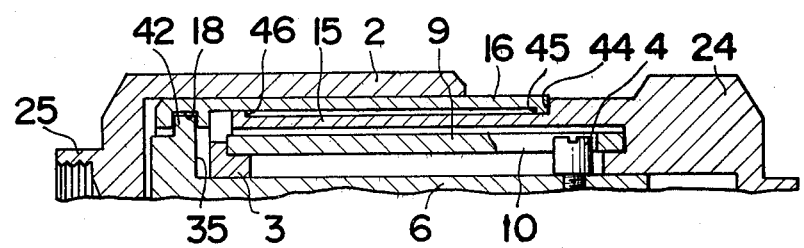

FIG. 11 illustrates an eighth embodiment of the present invention in which holding frame 6 and indicating ring 16 are coupled in the manner similar to that of FIG. 10. An inwardly projecting portion 45 is formed on the inner face at the rear end of indicating ring 16 so that it alternatively abuts shoulder portion 44 and another shoulder portion 46 opposed thereto which is provided on the front outer face of external cylinder 15 on fixed cylinder 3, as in FIG. 10, when holding frame 6 is moved to its rearmost or forwardmost position respectively. In the present construction, stop 27 and elongated recess 26, as shown in FIG. 4, may be omitted.

Figure 12:
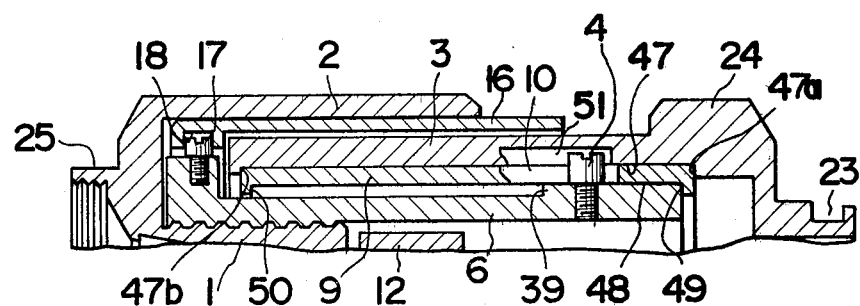

FIG. 12 illustrates a ninth embodiment of the present invention in which the external cylinder 15 on fixed cylinder 3 provided in each of the earlier described embodiments is eliminated, and the cam ring 9 rotatably engages the inside face of fixed cylinder 3 with its movement along the optical axis being prevented by opposing shoulder portions 47a and 47b formed proximate opposite ends of cylinder 3. Holding frame 6 longitudinally slidably engages the inside face of cam ring 9. Projecting portion 39 formed on the outer face at the rear end of holding frame 6 is provided so as to alternatively abut shoulder portions 49 and 50 opposed to each other and directed inwardly from opposite ends of the inner face of cam ring 9, respectively, when holding frame 6 is moved to its rearmost or forwardmost positions, respectively, or immediately before it reaches the respective positions. In the present embodiment, an impact force transmitted to holding frame 6 is transferred to cam ring 9 through projecting portion 39 and shoulder portion 49 or 50 and is absorbed by shoulder portion 47a or 47b. Stop 27 and elongated recess 26 may be eliminated in the present embodiment. Pin 4 engaging cam ring lead groove 10 also engages an axial groove 51 in fixed cylinder 3 in substitution for slot 5 provided in fixed cylinder 3 in the earlier embodiments.

The present invention is not limited to the abovementioned embodiments and may include a variety of other similarly functioning structures. In addition, as is clear in the embodiments decribed above, stop 27 and elongated recess 26, as shown in FIG. 4, can be eliminated since holding frame 6 to be moved during zooming operation is stopped at the positions where holding frame 6 is rearmost or forwardmost, that is closest to the camera and object sides, respectively. In other words, an impact absorption mechanism for receiving an impact force which is imparted to lens barrel head 25 serves as a mechanism for restricting the rotation of cam ring 9 to a predetermined amount. Lead groove 10 and cam groove 11 may be made a cam groove and a lead groove, respectively. The stopper means and stop means may advantageously be controllable in position.

When, according to the present invention, an impact force is imparted or transmitted to holding frame 2 moving during zooming operation, the movement of holding frame 2 is stopped by the abutment between holding frame 2 or a sufficiently strong part of a member held thereby and fixed cylinder 3 or a sufficiently strong part of a member held thereby so as to receive the impact force. Therefore, the impact force does not act on the relatively weak parts of the zooming operation mechanism, e.g., engageable parts, such as follower pins, guide tracks such as lead grooves and cam grooves, causing parts of the zooming mechanism not to be deformed, damaged or broken and assuring a reliable and smooth operation, and high accuracy and durability for extended periods of time. In addition, the lens barrel, according to the present invention, can be provided easily and inexpensively without any complexity in construction, and many conventional zoom lens barrels may also be easily improved.

While there have been described and illustrated preferred embodiments of the present invention, it is apparent that numerous alterations, omissions and additions may be made without departing from the spirit thereof.

I claim:

1. A zoom lens comprising a camera mountable barrel section, front and rear lens mounts axially movable in said barrel section, a rotatable cylindrical cam carried by and restricted against longitudinal movement relative to said barrel section and having a first track, a first follower longitudinally movable with said front mount and slidably engaging said first track, said zoom lens being characterized in the provision of a first stop section longitudinally movable with said front mount and a second stop section stationary relative to said barrel section, and in the path of movement of said first stop section and abutting said first stop section when said front mount is at the rearmost position thereof with said first follower being forward of the rear end of said track whereby the axial component of an impact imparted to said front mount bypasses said follower and track and is transmitted directly to said barrel section.

2. The zoom lens of claim 1 wherein said barrel section has a second guide slot formed therein, having a path intersecting that of said first track and said first follower slidably engages said second track.

3. The zoom lens of claim 1 comprising a first frame including an axial first sleeve helicoidally coupled to said first mount and projecting rearwardly from said front mount and having said first follower radially projecting therefrom, a second follower radially projecting from said rear mount, a pair of longitudinally extending first and second guide tracks formed in said barrel section, said first track being defined by a first cam slot formed in said cam and said cam having a second cam slot formed therein, said first follower slidably engaging said first cam slot and first guide track and said second follower slidably engaging said second cam slot and said second guide track.

4. The zoom lens of claim 3 wherein said first stop section is defined by a rear portion of said first frame and said second stop section includes a circular shoulder located on said barrel section rearwardly of and in the longitudinal path of said first stop section.

5. The zoom lens of claim 3 wherein said first stop section is defined by a rear portion of said first frame and said second stop section comprises a stop member connected by screws to the inside face of said barrel section rearwardly of said first stop section.

6. A zoom lens comprising a camera mountable barrel section, front and rear lens mounts axially movable in said barrel section, a rotatable cylindrical cam carried by and restricted against longitudinal movement relative to said barrel section and having a first track, a first follower longitudinally movable with said front mount and slidably engaging said first track, said zoom lens being characterized in the provision of a first stop section defined by a ring of greater diameter than and engaging said first follower and being longitudinally movable with said front mount, a second stop section stationary relative to said barrel section, and in the path of movement of said first stop section and abutting said first stop section when said front mount is at the rearmost position thereof with said first follower being forward of the rear end of said track, a first frame including an axial first sleeve helicoidally coupled to said first mount and projecting rearwardly from said front mount and having said first follower radially projecting therefrom, a second follower radially projecting from said rear mount and a pair of longitudinally extending first and second guide tracks formed in said barrel section, said first track being defined by a first cam slot formed in said cam and said cam having a second cam slot formed therein, said first follower slidably engaging said first cam slot and first guide track and said second follower slidably engaging said second cam slot and said second guide track.

7. The zoom lens of claim 3 comprising a second axial sleeve surrounding said barrel section and longitudinally movable with said first sleeve, the rear portion of said second sleeve defining said first stop section.

8. The zoom lens of claim 7 including a third stop section disposed in said barrel section forward of said second stop section, said second sleeve rear portion including an inwardly directed flange alternatively abutting said second and third stop sections when said front mount is in its rearmost and forwardmost positions respectively with said first follower being respectively forwardly of the rear end of said first cam slot and rearwardly of the front end of said first cam slot.

9. The zoom lens of claim 1 comprising a third stop section movable with said front mount and a fourth stop section longitudinally stationary relative to said barrel section, said third and fourth stop sections being in stop abutment when said front mount is in its forwardmost position with said first follower rearwardly of the front end of said first track.

10. A zoom lens barrel mechanism for an optical system which has an optical axis and at least first and second lens elements, said first lens element being disposed closest to an object and being movable along said optical axis both upon focusing and zooming operations while said second lens element is moved only upon zooming operation, said barrel mechanism comprising:
a fixed cylinder;
manually operable means movable in rotational and axial directions with respect to said fixed cylinder for effecting focusing and zooming operations;
means for holding said first lens element and being responsive to said rotational and axial movements of said manually operable means;
intermediate member connected to said holding means to be axially moved when said holding means axially moves in response to the axial movement of said manually operable means for focusing;
means for driving said second lens element in accordance with the axial movement of said intermediate member, said driving means including co-operative cam and engaging means which are movable relative to and in contact with one another when said intermediate member is axially moved;
stopper means integrally movable with said intermediate member; and
stop means provided on said fixed cylinder so as not to move in axial direction, said stop means being engaged by said stopper means until said engaging means reaches the end of said cam means when said intermediate member is moved away from the object.

11. A barrel mechanism as set forth in claim 10, further comprising means for preventing rotation of said intermediate member, and wherein said intermediate member includes a helical thread engaged by said holding means.

12. A barrel mechanism as set forth in claim 11, wherein said manually operable means is integrally coupled with said holding means.

13. A barrel mechanism as set forth in claim 10, wherein said stopper means includes a portion integrally provided on the rear end of said intermediate member as a part thereof, said stop means includes a stop member attached to said fixed cylinder.

14. A barrel mechanism as set forth in claim 13, wherein said stop member is of a cylindrical shape.

15. A barrel mechanism as set forth in claim 13, wherein said stop member is a ring shaped plate.

16. A barrel mechanism as set forth in claim 13, wherein said stop member is a curved plate.

17. A barrel mechanism as set forth in claim 10, wherein said stopper means and stop means are a pair of portions respectively provided on said intermediate member and fixed cylinder as integral parts thereof.

18. A barrel mechanism as set forth in claim 11 wherein said preventing means includes a cylindrical portion which is provided as an integral part of said fixed cylinder and has an axial groove, and a pin which is secured to said intermediate member and fits into said axial groove, and wherein said stop means includes a wall portion delineating a rear end portion of said axial groove, and wherein said stopper means includes a collar member coupled by said pin, said collar member being formed with an engaging surface engageable with said wall portion in face contact condition.

19. A barrel mechanism as set forth in claim 18, wherein said cylindrical portion further includes a second wall portion which delineates a front end portion of said axial groove and is of a configuration engageable with said collar member in face contact condition, whereby said intermediate member is restricted to a predetermined amount of movement.

20. A barrel mechanism as set forth in claim 10, wherein said stop means includes a portion integrally provided on said fixed cylinder as a part thereof, and said stopper means includes an engaging member connected to said intermediate member so as to move in axial direction when said intermediate member is axially moved.

21. A barrel mechanism as set foth in claim 20 wherein said engaging member is an indicating cylinder provided on its periphery with graduations which indicate camera-to-object distance.

22. A zoom lens barrel mechanism for an optical system which has an optical axis and at least first and second lens elements, said first lens element being disposed closest to an object and being movable along said optical axis both upon focusing and zooming operations while said second lens element is moved only upon zooming operation, said barrel mechanism comprising:
a fixed cylinder;
manually operable means movable in rotational and axial directions with respect to said fixed cylinder for effecting focusing and zooming operations;
means for holding said first lens element and being responsive to said rotational and axial movements of said manually operable means;
intermediate member connected to said holding means to be axially moved when said holding means axially moves in response to the axial movement of said manually operable means for focusing;
means for driving said second lens element in accordance with the axial movement of said intermediate member, said driving means including co-operative cam and engaging means which are movable relative to and in contact with one another when said intermediate member is axially moved;
stopper means integrally movable with said intermediate member; and
stop means provided on said fixed cylinder so as not to move in axial direction, said stop means including a pair of engaging portions respectively engaged by said stopper means until said engaging means reaches one of the ends of said cam means.

23. A barrel mechanism as set forth in claim 22, wherein said stopper means is a projecting portion integrally provided on said intermediate member, said pair of engaging portions are integrally provided on said fixed cylinder as parts thereof and are disposed at both end portions of the moving path of said projecting portion.

24. A barrel mechanism as set forth in claim 22, wherein said stopper means includes an engaging member connected to said intermediate member so as to move in axial direction when said intermediate member is axially moved, said engaging member being provided with a projecting portion, said pair of engaging portions are integrally provided on said fixed cylinder as parts thereof and are disposed at both end portions of the moving path of said projecting portion.

25. A barrel mechanism as set forth in claim 24, wherein said engaging member is an indicating cylinder provided on its periphery with graduations which indicate camera-to-object distance.

26. A barrel mechanism as set forth in claim 22, wherein said stopper means includes a projecting portion integrally provided on said intermediate member as a part thereof, said stop means includes an engaging cylinder which is interconnected to said fixed cylinder so as not to move in axial direction and is integrally provided with said engaging portions as parts thereof, said engaging portions being disposed at both end portions of the moving path of said projecting portion.

27. A barrel mechanism for a zoom lens system including a first lens element, a second lens element and a common optical axis therefor, said barrel mechanism including:

a first lens holder for holding said first lens element and having a portion extending to the frontmost of said barrel mechanism;

a second lens holder for holding said second lens element;

a manual member rectilinearly movable along said optical axis accompanying said first lens holder;

an intermediate member movable along said optical axis in response to the rectilinear movement of said first lens holder;

a cam-slot coupling for driving said second lens holder in accordance with the movement of said intermediate member; and a stop member for restricting the range of the movement of said intermediate member.

28. A barrel mechanism as set forth in claim 27 further comprising a fixed cylinder and means for limiting the movement of said intermediate member only in the rectilinear axial direction, and wherein said cam-slot coupling includes a pin and a cam groove receiving the pin so that the pin moves in the groove to the end of the groove and said stop member is fixed on said fixed cylinder to stop said intermediate member before said pin reaches said end of the groove.

* * * * *